US007913172B2

(12) United States Patent
Rjaibi et al.

(10) Patent No.: US 7,913,172 B2
(45) Date of Patent: Mar. 22, 2011

(54) FINE-GRAINED, LABEL-BASED, XML ACCESS CONTROL MODEL

(75) Inventors: Walid Rjaibi, Markham (CA); Zheng (Alex) Zhang, Toronto (CA)

(73) Assignee: International Business Machines Corporation, Armonk, NY (US)

(*) Notice: Subject to any disclaimer, the term of this patent is extended or adjusted under 35 U.S.C. 154(b) by 817 days.

(21) Appl. No.: 11/849,267

(22) Filed: Sep. 1, 2007

(65) Prior Publication Data

US 2009/0063951 A1    Mar. 5, 2009

(51) Int. Cl.
*G06F 17/00* (2006.01)
(52) U.S. Cl. ......... 715/741; 715/205; 715/234; 715/239
(58) Field of Classification Search .................. 715/741, 715/234–237, 743; 726/2
See application file for complete search history.

(56) References Cited

U.S. PATENT DOCUMENTS

| | | | | |
|---|---|---|---|---|
| 2005/0050010 | A1 | 3/2005 | Linden | 707/3 |
| 2005/0076030 | A1 | 4/2005 | Hada et al. | 707/9 |
| 2005/0144176 | A1* | 6/2005 | Lei et al. | 707/100 |
| 2008/0059448 | A1* | 3/2008 | Chang et al. | 707/5 |
| 2008/0319999 | A1* | 12/2008 | Simpson et al. | 707/9 |

OTHER PUBLICATIONS

Damiani et al., ("A Fine-Grained Access Control System for XML Document"—Published May 2002 pp. 169-199).*
Sunmoon et al., "Access Control Model for Secure XML Documents," Jul. 14-16, 2005, whole document, South Korea.
Li et al., "Enforce Mandatory Access Control Policy on XML Documents," Jan. 2005, pp. 336-349, Shanghai China.
Cuppens et al.,"Protection of Relationships in XML Documents with the XML-BB Model", Jan. 2005, whole document.
Fomichov et al.,"Sedna: A Native XML DBMS", Jan. 2004, whole document.
Zhang et al., "Inter-Node Relationship Labeling: A Fine-Grained XML Access Control Implementation Using Generic Security Labels," E-Business and Telecommunications Networks, Jan. 2008, pp. 158-170, vol. 9.
Mohan et al., "Access Control for XML-A Dynamic Query Rewriting Approach", Oct. 31-Nov. 5, 2005, pp. 251-252.

* cited by examiner

*Primary Examiner* — Doug Hutton
*Assistant Examiner* — Quoc A Tran
(74) *Attorney, Agent, or Firm* — Kunzler Needham Massey & Thorpe

(57) ABSTRACT

A method for controlling access to an XML document includes referencing a schema definition comprising a path security label definition associated with a sibling-to-sibling path of an XML document. An XML document may then be validated by comparing it with the schema definition. This validation may include verifying that the XML document has a path security label associated with a sibling-to-sibling path that is at least as restrictive as that specified by the path security label definition. An access security label may be assigned to a user seeking to access the sibling-to-sibling path. The path security label and the access security label may then be compared, using pre-determined access rules, to determine whether the user is authorized to access the sibling-to-sibling path. Access to the sibling-to-sibling path may then be granted or denied according to the access rules.

8 Claims, 1 Drawing Sheet

ATTACH path-label
ANCS path1
DESC path2

ATTACH path-label
NODE path1
PRECEDING-SIBLING path2
FOLLOWING-SIBLING path3

FINE-GRAINED, LABEL-BASED, XML ACCESS CONTROL MODEL

BACKGROUND OF THE INVENTION

1. Field of the Invention

This invention relates to XML access control and more particular to fine-grained, label-based, XML access control models.

2. Description of the Related Art

XML has rapidly emerged as the prevalent standard for representing and exchanging business and other sensitive data over the Internet. The current trend to add XML support to database systems, however, poses new security challenges in an environment where both relational and XML data coexist. In particular, fine-grained access control methodologies may be even more important for XML data than for relational data, given the more flexible and less homogeneous structure of XML data compared to relational tables and rows.

Controlling access to XML data may be more difficult than controlling access to relational data for several reasons. First, the semi-structured nature of XML data, where a schema may be absent, or, even if present, may allow significantly more flexibility and variability in the structure of the document than is allowed by a relational schema. Second, the hierarchical structure of XML may require specifying how access privileges to certain nodes propagate to and from the nodes' ancestors and descendants.

In almost all models for controlling access to XML, the smallest unit of protection is a node of an XML document, which is typically specified using an XPath fragment. Access to ancestor/descendant and sibling relationships among nodes has typically not been considered. In general, an access control policy consists of positive or negative authorization rules that grant or deny access to selected nodes of an XML document. The main difference between most XML access control models lies in privilege propagation. For example, some models forbid access to entire sub-trees that are rooted at inaccessible nodes.

In other models, an ancestor node for which access is denied may be masked as an empty node if access is granted to a descendant node. However, this model may make the literal of the forbidden ancestor visible in the path from the root node to the authorized node. In some cases, this situation may be improved by replacing the literal of an ancestor node literal with a dummy value. However, this still does not solve the problem that different descendant nodes may require their ancestor's literal to be visible or invisible in a different manner. Accordingly, each of the above models makes it difficult to define a view that precisely describes the path leading to an authorized node.

In view of the foregoing, what is needed is an access control model for XML that provides a more fine-grained level of control. Ideally, such a model would be able to protect relationships between nodes as opposed to the nodes themselves. Further needed is a model that utilizes security labels to protect these relationships.

SUMMARY OF THE INVENTION

The present invention has been developed in response to the present state of the art, and in particular, in response to the problems and needs in the art that have not yet been fully solved by currently available methods for controlling access to information in XML documents. Accordingly, the present invention has been developed to provide a fine-grained, label-based model for controlling access to XML documents that remedies various problems in the art.

Consistent with the foregoing and in accordance with the invention as embodied and broadly described herein, a method for controlling access to an XML document includes referencing a schema definition comprising a path security label definition associated with a path of an XML document. As used herein the term "path" in an XML document refers to an ancestor-to-descendent path, a sibling-to-sibling path such paths, edges, and relationships between nodes of an XML document. An XML document with security labels may then be validated by comparing it with the schema definition. This validation may include verifying that the XML document has a path security label associated with a path that is at least as restrictive as that specified by the path security label definition. Similarly, an access security label may be defined for a user seeking to access a sibling-to-sibling path. In one embodiment, the security administrator may define the access security label for a user. The path security label and the access security label may be compared, using pre-determined access rules, to determine whether the user is authorized to access the sibling-to-sibling path. Access to the sibling-to-sibling path may then be granted or denied according to the access rules.

In a second aspect of the invention, a computer program product may be provided to control access to an XML document comprising a plurality of nodes and a plurality of paths, or relationships, between the nodes. The computer program product may include a computer-readable medium storing a program of computer-readable instructions. When executed, these instructions may cause a computer to generate a schema definition comprising a path security label definition associated with a sibling-to-sibling path of an XML document. The instructions may further enable an XML document to be validated by comparing it with the schema definition. This validation may include verifying that the XML document has a path security label associated with a sibling-to-sibling path that is at least as restrictive as that specified by the path security label definition. These instructions may further cause the computer to reference an access security label to a user seeking to access the sibling-to-sibling path of the XML document and compare, using pre-determined access rules, the path security label to the access security label to determine whether the user is authorized to access the sibling-to-sibling path. In one embodiment, these instructions may cause the computer to assign an access security label to an XML document that fails to comply with a given Document Type Definition (DTD) or XML Schema Definition (XSD). The access security label assigned may be at least as restrictive as a path security label designated in the DTD or XSD. Finally, the instructions may cause the computer to grant or deny access to the sibling-to-sibling path according to the access rules. The present invention provides novel methods for controlling access to XML documents. The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION OF THE INVENTION

Figures 1, 2, 3:
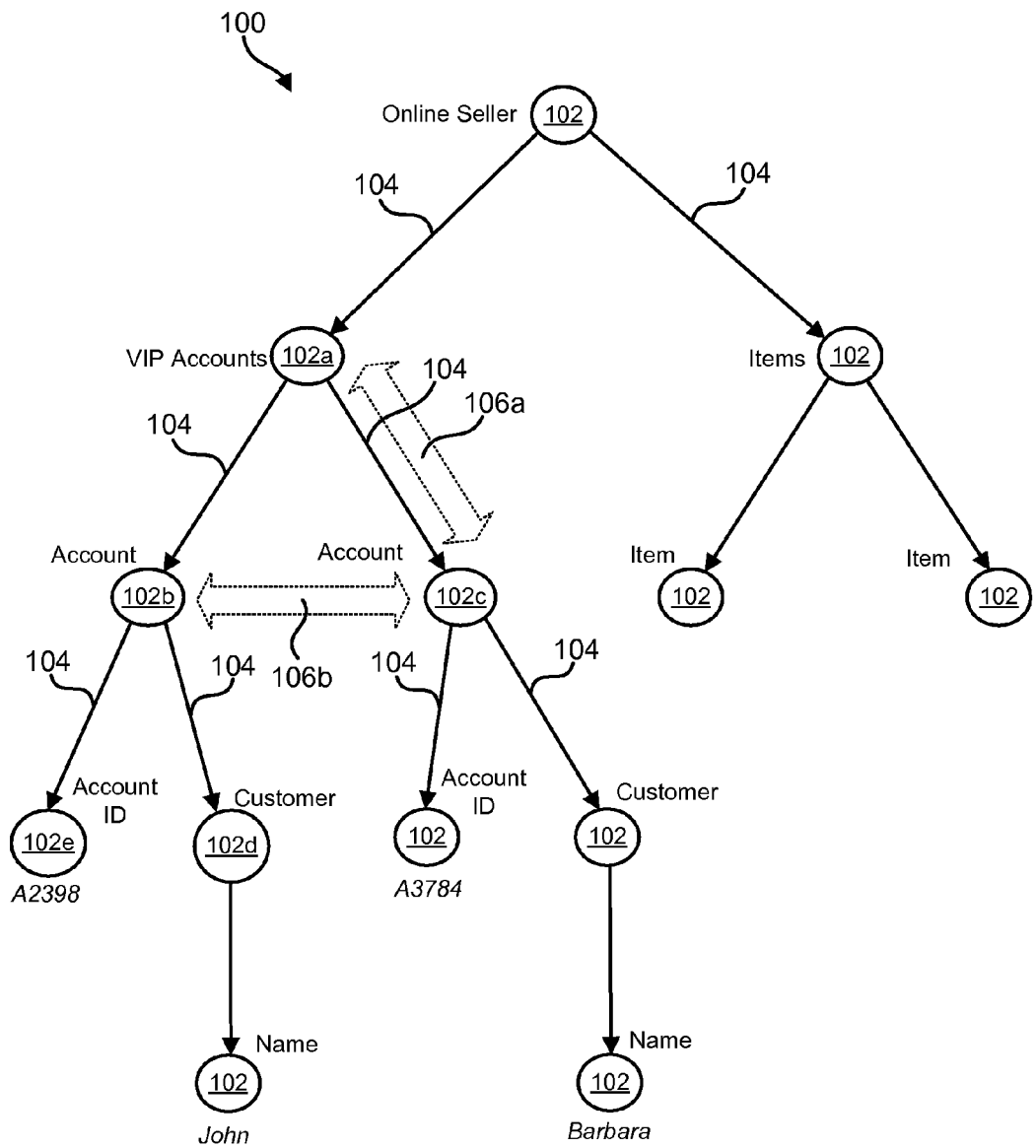
FIG. 1 illustrates one embodiment of an XML document tree structure that includes multiple nodes and paths between the nodes.
FIG. 2 illustrates one embodiment of an SQL/XPath extension, or statement, to attach a path security label to a parent-to-child path.
FIG. 3 illustrates one embodiment of an SQL/XPath extension, or statement, to attach a path security label to a sibling-to-sibling path.

It will be readily understood that the components of the present invention, as generally described and illustrated in the Figures herein, could be arranged and designed in a wide variety of different configurations. Thus, the following more detailed description of the embodiments of systems and methods in accordance with the present invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Referring to FIG. 1, one embodiment of an XML document tree structure 100 is illustrated to provide a basic understanding of the invention. Here, the document tree structure 100 stores account and item information associated with an online seller. As shown, the document tree structure 100 includes a plurality of nodes 102 arranged in a hierarchical tree structure. The relationship between the nodes 102 may be represented by a plurality of paths 104 traveling between each of the nodes 102. As mentioned previously, the smallest unit of protection in most conventional XML access control models has been the node 102. This method of protection, however, may violate various security principles such as the "need-to-know" and "choice" security principles by leaking unnecessary or confidential information.

For example, consider the sub-tree rooted at node 102a and represented by the literal "VIP Accounts." Suppose that the security policy is such that access to node 102b is authorized while access to node 102c is unauthorized. Using a node-based security approach, granting access to node 102b will normally require granting access to the root node 102a. Once access is granted to the root node 102a, access will normally be automatically granted to the child node 102c. Thus, it may be very difficult to implement a node-based security approach that can grant access to node 102b while simultaneously denying access to node 102c. As a result, many node-based security approaches violate the "need-to-know" or "choice" security principles because they leak information about the node 102c.

In selected embodiments in accordance with the invention, a path- or relationship-based security approach may be used to provide a more fine-grained, expressive, and effective access control model to protect information in the XML document 100. In such a model, ancestor/descendant and sibling relationships 104, or paths 104, may be considered legitimate elements to be protected. Such a model may also better comply with security principles such as the "need-to-know" and "choice" security principles.

In certain embodiments, one or more of the paths 104 may be protected with a "security label" associated with a label-based access control (LBAC) implementation. In such an implementation, the path security label may be compared to an access security label granted to a subject (e.g., a user) attempting to access or traverse the path. Whether access is authorized may be determined based on pre-determined set of label access rules. Access to the path may then be denied or granted based on the label access rules.

For example, consider again the sub-tree rooted at node 102a. If the security policy is such that access to node 102b is authorized while access to node 102c is unauthorized, a security label 106a may be attached to the parent-to-child path between the root node 102a and the child node 102c. A second security label 106b may be attached to the sibling-to-sibling relationship between node 102c and node 102b. As a result, access may be granted to the path between the root node 102a and the child node 102b while simultaneously denying access to all paths leading to the child node 102c.

In selected embodiments, an SQL extension, also referred to herein as a command or statement, may be provided to enable an access security label to be granted to a user. Such an extension may already be available in various database management systems, such as IBM's DB2 version 9. For example, one embodiment of an extension may be implemented using the following SQL statement:

GRANT ACCESS LABEL label-name
TO USER user-name FOR READ ACCESS

Here, label-name designates the name of the access security label and user-name designates the name of the user who is granted the access security label. Similarly, the phrase "FOR READ ACCESS" may be replaced with the phrase "FOR WRITE ACCESS" or "FOR ALL ACCESS" to grant either read access, write access, or both types of access to the user.

Referring to FIGS. 2 and 3, various SQL/XPath extensions may also be provided to enable security labels to be attached to paths 104 between nodes 102. For example, FIG. 2 shows one embodiment of an SQL statement that may be used to attach a security label to an ancestor/descendant path (including a parent-to-child path) of an XML document. In this embodiment, path1 and path2 are XPath expressions designating the nodes at each end of the path, with path2 being an XPath expression relative to path1. Path-label may be used to designate the name of the security label that is attached to the path.

For example, the following statement may be used to attach a path security label having the name "EXISTENCE" to the relationship between the node 102a and the node 102c of FIG. 1:

ATTACH EXISTENCE
ANCS //VIP Accounts
DESC /Account[Customer/Name = "Barbara"]

FIG. 3 shows one embodiment of an SQL statement that may be used to attach a security label to a sibling-to-sibling path of an XML document. In this embodiment, path1, path2, and path3 are XPath expressions, with path2 and path3 being XPath expressions relative to path1. Path2 and path3 specify relationships between the node specified by path1, and the node's preceding and following siblings. If the node does not have preceding siblings, the PRECEDING-SIBLING expression may be deleted from the statement. Similarly, if the node does not have following siblings, the FOLLOWING-SIBLING expression may be deleted from the statement. Like the extension illustrated in FIG. 2, path-label may designate the name of the security label attached to the sibling-to-sibling path.

For example, the following statement may be used to attach a path security label with the name "VALUE" to the sibling-to-sibling relationship between the node 102b and the node 102c of FIG. 1:

```
ATTACH VALUE
NODE //Account[Customer/Name = "Barbara"]
PRECEDING SIBLING /Account
```

In addition to providing support for the above SQL/XPath statements, an extension may be provided to the SQL compiler. This extension may ensure that the access plan generated to fetch a column of type XML in a database table also includes the access rules for evaluating a user's access rights with respect to the content of the XML column. The goal is to allow users to label node relationships and let them be sure that what they want to conceal is truly concealed from the users whose access labels do not satisfy the label access policy with the path labels. Unfortunately, it is impossible to guarantee concealment for any arbitrary set of relationships. Sometimes, it is possible to infer a concealed relationship from the relationships that are not concealed.

Let us consider an example of four cases where a relationship could be inferred from a pair of non-concealed relationship. Referring to FIG. 1, suppose it is known that Account Node 102b is a descendant of VIP Accounts Node 102a and Customer Node 102d is a descendant of Account Node 102b. Then, there is no point to conceal the ancestor-descendant relationship between VIP Accounts Node 102a and Customer Node 102d. Suppose it is known that Customer Node 102d is a descendant of VIP Accounts Node 102a as well as Account Node 102b. Since there is only one path from the root of the document to Account Node 102b, there is no point to conceal the ancestor-descendant relationship between VIP Accounts Node 102a and Account Node 102b.

Suppose it is known that Account Node 102b and Account Node 102c are the children of VIP Accounts Node 102a, then there is no point to conceal the sibling relationship between Account Node 102b and Account Node 102c. Suppose it is known that VIP Accounts Node 102a has a descendant Customer Node 102d and the customer has a sibling Account ID 102e, then there is no point to conceal the ancestor-descendant relationship between VIP Accounts Node 102a and Account ID 102e. We say a set of labeled relationships/paths in an XML document D is not secure with respect to a path label L if one of the following four cases occurs.

1. Case 1: D has three nodes, $n_1$, $n_2$ and $n_3$ s.t. the ancestor-descendant path from $n_1$ to $n_2$ and the ancestor-descendant path from $n_2$ to $n_3$ have labels $L_{12} < L$ and $L_{23} < L$. The ancestor-descendant path from $n_1$ to $n_3$ has a label $L_{13} \geq L$.

2. Case 2: D has three nodes, $n_1$, $n_2$ and $n_3$ s.t. the ancestor-descendant path from $n_1$ to $n_3$ and the ancestor-descendant path from $n_2$ to $n_3$ have labels $L_{13} < L$ and $L_{23} < L$. The ancestor-descendant path from $n_1$ to $n_2$ has a label $L_{12} \geq L$.

3. Case 3: D has three nodes, $n_1$, $n_2$ and $n_3$ s.t. $n_1$ is the parent of $n_2$ and $n_3$, the parent-child path from $n_1$ to $n_2$ and the parent-child path from $n_1$ to $n_3$ have labels $L_{12} < L$ and $L_{13} < L$. The sibling path from $n_2$ to $n_3$ has a label $L_{23} \geq L$ or the sibling path from $n_3$ to $n_2$ has a label $L_{32} \geq L$.

4. Case 4: D has three nodes, $n_1$, $n_2$ and $n_3$ s.t. the ancestor-descendant path from $n_1$ to $n_2$ has a label $L_{12} < L$, and either the sibling path from $n_2$ to $n_3$ has a label $L_{23} < L$ or the sibling path from $n_3$ to $n_2$ has a label $L_{32} < L$. The ancestor-descendant path from $n_1$ to $n_3$ has a label $L_{13} \geq L$.

There is a simple test to verify that a set of labeled relationships/paths in an XML document D is not secure with respect to a path label L. The test starts by computing three ternary relations $R_1$, $R_2$ and $R_3$. The first two columns store the start/end nodes of paths. The third column stores the label associated with paths (if a label is missing, then it is a NULL value). In particular, $R_1$ stores all ancestor-descendant paths in D, $R_2$ stores all parent-child paths in D, and $R_3$ stores all sibling paths in D.

1. Case 1 is true for a path label L if and only if the expression $\pi_{\$1,\$5}(R_{1,L}*\$2=\$1\ R_{1,L})-R_{1,L}$ is not empty where $R_{1,L}$ is $\sigma_{\$3<L}(R_1)$.

2. Case 2 is true for a path label L if and only if the expression $\pi_{\$1,\$4}(R_{1,L}*\$2=\$2\ R_{1,L})-R_{1,L}$ is not empty where $R_{1,L}$ is $\sigma_{\$3<L}(R_1)$.

3. Case 3 is true for a path label L if and only if the expression $\pi_{\$2,\$5}(R_{2,L}*\$1=\$1\ R_{2,L})-R_{3,L}$ is not empty where $R_{2,L}$ is $\sigma_{\$3<L}(R_2)$ and $R_{3,L}$ is $\sigma_{\$3<L}(R_3)$.

4. Case 4 is true for a path label L if and only if the expression $\pi_{\$1,\$5}(R_{1,L}*\$2=\$1\ R_{3,L})-R_{1,L}$ is not empty where $R_{1,L}$ is $\sigma_{\$3<L}(R_1)$ and $R_{3,L}$ is $\sigma_{\$3<L}(R_3)$.

Furthermore, we give intuitive conditions to construct a secure set of labeled relationships for an XML document. If we ignore the directions of ancestor-descendant and sibling paths, all these paths form cycles in an XML document. To assign a path label L to a relationship between two nodes $n_1$ and $n_2$ in an XML document D, we must make sure, for every cycle that includes the path from $n_1$ to $n_2$, either there is another path whose label $L_o \geq L$, or $n_1$ and $n_2$ are descendants of some nodes in the cycle and $n_1$, $n_2$ are not children of the same parent. Both cases ensure there is uncertainty whether a relationship between two nodes $n_1$ and $n_2$ exists: the first case by having another path missing in the cycle, while in the second case, the fact that $n_1$ and $n_2$ are descendants of some nodes in the cycle introduces uncertainty except when they are children of the same parent, in which case the sibling relationship between $n_1$ and $n_2$ is leaked.

In certain embodiments, a DTD may be used to verify that certain security labels are assigned to paths of an XML document 100. In the event one or more paths of an XML document 100 do not include the security labels specified in the DTD, these security labels may be added to the XML document 100 to make it conform to the DTD. This feature may be provided to ensure that protected information in an XML document 100 is truly concealed from users lacking the required authority. This feature may also reduce the chance that users will infer the existence of a concealed relationship from other relationships that are not concealed.

For example, in certain embodiments, security labels may be validated in an XML document 100 using an attribute declaration in a DTD having the following form:

```
<!ATTLIST N SecurityLabel (Path1 Label1 | Path2 Label2 | ...),
#REQUIRED/#IMPLIED>
```

Here, N can be instantiated to be a set of nodes in an XML document 100 (e.g., VIP Accounts), Path1, Path2, etc. identify instantiated paths relative to each of the nodes to be protected by a security label, and Label1, Label2, etc. identify security labels to be attached to the instantiated paths of Path1, Path2, etc., respectively. In selected embodiments, N, Path1, Path2, etc. may be identified using XPath expressions. Similarly, Path1, Path2, etc. may designate ancestor/descendant, sibling-to-sibling, or other desired paths in the XML document 100. The #REQUIRED/#IMPLIED syntax may be used to designate whether the security labels identified in the attribute declaration are required (e.g., #REQUIRED) or are merely optional (e.g., #IMPLIED).

In operation, when validating an XML document 100 with the DTD, the above-identified attribute declaration may be checked against the attributes in the XML document 100. This may be performed to verify that the XML document 100 has path security labels at least as restrictive as those designated in the DTD. If the XML document 100 does not include path security labels that are at least as restrictive as those designated in the DTD, path security labels may be inserted into the XML document 100 to make it conform to the DTD. Conversely, path security labels of the XML document 100 that are more restrictive than those designated in the DTD may be left alone. Thus, the DTD may be used to impose a set of minimum security requirements on paths of the XML document 100.

In certain embodiments, when attempting to access an XML document 100, a user's security label may be compared to the path security labels designated in the DTD as opposed to comparing it with the path security labels of the XML document 100. This may improve efficiency because a DTD is typically much smaller than the XML document 100 it is associated with. If the user is not authorized to access the paths specified in the DTD, the user will not be authorized to access the corresponding instantiated paths in the XML document 100. This is because the XML document 100 will have security labels that are at least as restrictive as those specified in the DTD.

On the other hand, if the user is authorized to access paths designated in the DTD, the user is not necessarily authorized to access the corresponding paths in the XML document 100. This is because the XML document 100 may have security labels that are more restrictive than those specified in the DTD. If this is the case, the user's security label may also be compared to the path security labels of the XML document 100 to determine whether the user is authorized to access the paths.

It should be recognized that the features and advantages discussed above with respect to a DTD may also be applied to other languages for describing the schemas of XML documents, such as the XSD language.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a nontransitory computer-readable medium having computer usable program code executable to perform operations to control access to an Extensible Markup Language (XML) document comprising a plurality of nodes and a plurality of paths between each of the nodes, the operations of the computer program product comprising:

referencing a schema definition comprising a path security label definition associated with a sibling-to-sibling pa~ relationship of an XML document, the path security label definition defining access rights for the sibling-to-sibling relationship, the sibling-to-sibling relationship comprising a relationship between a first child node and a second child node, the first child node and the second child node descending from a parent node, the XML document further comprising a parent path security label definition associated with a parent-to-child path, the parent path security label definition defining access rights for the parent-to-child path, the parent-to-child path comprising a path between the parent node and the first child node, while simultaneously denying access to all paths leading to the first child node;

receiving an XML document to be validated by comparison with the schema definition;

comparing the XML document to the schema definition;

verifying that the XML document has a path security label associated with the sibling-to-sibling relationship that is at least as restrictive as that specified by the path security label definition of the schema definition for the first child node and the second child node associated with the sibling-to-sibling relationship;

determining an access security label assigned to a user seeking to access the sibling-to-sibling relationship protected by the path security label;

comparing, using pre-determined access rules, the additional path security label to the access security label to determine whether the user is authorized to access the parent-to-child path;

comparing, using the pre-determined access rules, the path security label to the access security label to determine whether the user is authorized to access the sibling-to-sibling relationship; and controlling access to the sibling-to-sibling relationship and the parent-to-child path for the first child node in accordance with the access rules.

2. The computer program product of claim 1, wherein the sibling-to-sibling relationship is specified in the schema definition using at least one Xpath expression.

3. The computer program product of claim 1, wherein the schema definition is selected from the group consisting of a document type definition (DTD) and an XML schema definition (XSD).

4. The computer program product of claim 1, wherein the access security label assigned to a user is assigned by a user issuing a Standardized Query Language (SQL) command utilizing a SQL extension to assign the access security label.

5. A computer program product to control access to an Extensible Markup Language (XML) document comprising a plurality of nodes and a plurality of paths between each of the nodes, the computer program product comprising a nontransitory computer-readable medium storing a program of computer-readable instruction that when executed on a computer causes the computer to:

generate a schema definition comprising a path security label definition associated with a sibling-to-sibling relationship of an XML document, the path security label definition defining access rights for the sibling-to-sibling relationship, the sibling-to-sibling relationship comprising a relationship between a first child node and a second child node, the first child node and the second child node descending from a parent node, the XML document further comprising a parent path security label definition associated with a parent-to-child path, the parent path security label definition defining access rights for the parent-to-child path, the parent-to-child path comprising a path between the parent node and the first child node, while simultaneously denying access to all paths leading to the first child node;
receive an XML document to be validated by comparison with the schema definition;
compare the XML document to the schema definition;
verify that the XML document has a path security label associated with the sibling-to-sibling relationship that is at least as restrictive as that specified by the path security label definition;
assign an access security label to a user seeking to access the sibling-to-sibling relationship protected by the path security label;
compare, using pre-determined access rules, the additional path security label to the access security label to determine whether the user is authorized to access the parent-to-child path;
compare, using the pre-determined access rules, the path security label to the access security label to determine whether the user is authorized to access the sibling-to-sibling relationship; and
control access to the sibling-to-sibling relationship and the parent-to-child path for the first child node in accordance with the access rules.

6. The computer program product of claim 5, wherein the sibling-to-sibling relationship is specified in the schema definition using at least one Xpath expression.

7. The computer program product of claim 5, wherein the schema definition is selected from the group consisting of a document type definition (DTD) and an XML schema definition (XSD).

8. The computer program product of claim 5, wherein assigning an access security label comprises utilizing a Standardized Query Language (SQL) extension to assign the access security label.

* * * * *